(12) United States Patent
Goschy et al.

(10) Patent No.: US 6,545,661 B1
(45) Date of Patent: Apr. 8, 2003

(54) VIDEO GAME SYSTEM HAVING A CONTROL UNIT WITH AN ACCELEROMETER FOR CONTROLLING A VIDEO GAME

(75) Inventors: Patrick E. Goschy, Carol Stream, IL (US); John M. Lowes, Chicago, IL (US)

(73) Assignee: Midway Amusement Games, LLC, Chicago, IL (US)

( * ) Notice: Subject to any disclaimer, the term of this patent is extended or adjusted under 35 U.S.C. 154(b) by 0 days.

(21) Appl. No.: 09/337,433

(22) Filed: Jun. 21, 1999

(51) Int. Cl.[7] .................................................. G09G 5/08
(52) U.S. Cl. ............................ 345/158; 463/37; 434/19
(58) Field of Search ................................ 345/157, 158, 345/161, 179–183; 463/36–39, 53; 434/18–24, 356; 718/19.05

(56) References Cited

U.S. PATENT DOCUMENTS

| | | |
|---|---|---|
| 4,126,851 A | 11/1978 | Okor |
| 4,127,849 A | 11/1978 | Okor |
| 4,302,138 A | 11/1981 | Zarudiansky ................... 414/5 |
| 4,414,537 A | 11/1983 | Grimes ................... 340/365 R |
| 4,488,017 A | 12/1984 | Lee .............................. 200/5 R |
| 4,519,097 A | 5/1985 | Chappell, Jr. et al. ............ 2/16 |
| 4,567,479 A | 1/1986 | Boyd .......................... 340/709 |
| 4,592,554 A * | 6/1986 | Gilbertson ....................... 463/5 |
| 4,613,139 A | 9/1986 | Robinson, II ........... 273/148 B |
| 4,660,828 A | 4/1987 | Weiss .......................... 272/138 |
| 4,695,831 A * | 9/1987 | Shinn .......................... 345/180 |
| 4,721,308 A | 1/1988 | Trimble ....................... 273/148 |
| 4,817,950 A | 4/1989 | Goo ........................ 273/148 B |
| 4,925,189 A | 5/1990 | Braeunig ................ 273/148 B |
| 5,038,144 A | 8/1991 | Kaye ............................ 341/176 |
| 5,128,671 A | 7/1992 | Thomas ......................... 341/20 |
| 5,319,397 A | 6/1994 | Yoshikawa .................. 345/179 |
| 5,337,606 A * | 8/1994 | Bennett et al. ........... 73/517 R |

(List continued on next page.)

FOREIGN PATENT DOCUMENTS

| | | | |
|---|---|---|---|
| EP | 0 807 800 A1 | 11/1997 | ........... G01B/11/00 |
| EP | 0 835 676 A1 | 4/1998 | ............. A63F/9/22 |
| WO | WO 98/17361 | 4/1998 | ............. A63F/9/22 |
| WO | WO 98/58265 | 12/1998 | ........... G01P/15/00 |

OTHER PUBLICATIONS

ADXL50, Technical Information, Analog Devices Inc., Rev. B, 1996.*
News Release for "New Game Controllers Using Analog Devices' G–Force Tilt To Be Featured At E3," Analog Devices, Inc., 13 pages (May 10, 1999).
TiltForce 2–Motion0Sensing Vibration Controller for Playstation Game Console.
TiltPak–Rumber and Motion–Sensing Pak for Niontendo 64.

*Primary Examiner*—Richard Hjerpe
*Assistant Examiner*—Alexander Eisen
(74) *Attorney, Agent, or Firm*—Jenkens & Gilchrist

(57) ABSTRACT

In one aspect of the present invention, there is provided a video game system including a game controller, a video display and a hand-held control unit. The game controller is coupled to the control unit and the video display. The control unit houses an accelerometer that senses the tilt of the control unit with respect to an axis. The accelerometer produces an acceleration signal indicating the tilt of the control unit with respect to the axis. The game controller processes the acceleration signal to control the movement of a game character on the video display.

In another aspect of the present invention, there is provided a video game system that further includes a light sensor housed in the control unit. The light sensor detects one or more light pixels from the video display and produces a detection signal to the game controller. The game controller determines from the detection signal the light pixels detected from the video display.

21 Claims, 3 Drawing Sheets

U.S. PATENT DOCUMENTS

| | | | | |
|---|---|---|---|---|
| 5,423,544 | A | | 6/1995 | Ichikawa .................. 273/164.1 |
| 5,423,554 | A | | 6/1995 | Davis ......................... 273/437 |
| 5,437,453 | A | * | 8/1995 | Hineman ..................... 463/38 |
| 5,488,362 | A | | 1/1996 | Ullman et al. ................ 341/20 |
| 5,526,022 | A | | 6/1996 | Donahue et al. ............ 345/156 |
| 5,540,095 | A | * | 7/1996 | Sherman et al. ......... 73/514.18 |
| 5,577,981 | A | | 11/1996 | Jarvik ........................... 482/4 |
| 5,586,887 | A | * | 12/1996 | McNelis et al. .............. 434/20 |
| 5,592,401 | A | | 1/1997 | Kramer ...................... 364/550 |
| 5,603,507 | A | | 2/1997 | Tice ............................. 463/29 |
| 5,679,075 | A | | 10/1997 | Forrest et al. ................. 463/9 |
| 5,721,566 | A | | 2/1998 | Rosenberg et al. ......... 345/161 |
| 5,724,264 | A | | 3/1998 | Rosenberg et al. ......... 364/559 |
| 5,796,354 | A | | 8/1998 | Cartabiano et al. ........... 341/22 |
| 5,835,077 | A | | 11/1998 | Dao et al. ................... 345/157 |
| 5,844,674 | A | | 12/1998 | Sieben ................. 356/139.03 |
| 5,853,324 | A | | 12/1998 | Kami et al. ..................... 463/2 |
| 5,913,727 | A | * | 6/1999 | Adhoot ......................... 463/39 |
| 5,933,135 | A | * | 8/1999 | Martin ....................... 345/179 |
| 6,072,467 | A | * | 6/2000 | Walker ....................... 345/157 |
| 6,115,482 | A | * | 9/2000 | Sears et al. ................. 382/114 |
| 6,146,278 | A | * | 11/2000 | Kobayashi ................... 463/53 |
| 6,196,919 | B1 | * | 3/2001 | Okubo ........................ 463/32 |

* cited by examiner

VIDEO GAME SYSTEM HAVING A CONTROL UNIT WITH AN ACCELEROMETER FOR CONTROLLING A VIDEO GAME

FIELD OF THE INVENTION

The present invention relates generally to video games and, more particularly, to a video game system having a control unit with an accelerometer that allows a user to navigate a video game character through a game environment by merely tilting the control unit.

BACKGROUND OF THE INVENTION

Traditionally, the movement of characters, symbols and/or objects in video games is accomplished by using a joystick, a mouse, a computer keyboard, or game buttons. As used hereinafter, the term "character" includes characters, symbols and/or objects. Joysticks typically consist of a handle mounted for pivotal movement between various radial positions. When a player moves the joystick in one direction, an electrical detection signal corresponding to the joystick position is communicated to a game controller to effect movement of a game character on a video display. Thus, the game controller processes the electrical signals and, according to a game program, moves the character in accordance with the position of the joystick.

In some games, the game player uses a joystick or mouse in conjunction with a button or keyboard to shoot targets in the game environment. Traditionally, in these games, the player moves the game character through the game environment by moving the joystick or the mouse. The player then shoots weapons by pressing a button or a keyboard key.

In other games, a light gun is used to choose a target to shoot at by pointing at different positions on the display and pulling the light gun's trigger (i.e., the player aims and shoots). Traditionally, in these games the game controller automatically selects where the character moves in the game environment after certain targets are shot.

Trackballs represent another form of control mechanism used, for example, in golf and/or baseball games. Trackballs, however, are less favored than joysticks by many game designers and players because, generally, they are more difficult to control than joysticks.

Accordingly, there is a need for a single hand-held control unit that allows a user to navigate a video game character through a game environment by merely tilting the control unit and then shoot a target on a video display by merely pressing a button or pulling a trigger. The present invention is directed to addressing one or more of these needs.

SUMMARY OF THE INVENTION

In accordance with one aspect of the present invention, there is provided a video game system including a game controller, a video display and a hand-held control unit. The game controller is coupled to the control unit and the video display. The control unit houses an accelerometer that senses the tilt of the control unit with respect to an axis. The accelerometer produces an acceleration signal indicating the tilt of the control unit with respect to the axis. The game controller processes the acceleration signal to control the movement of a game character on the video display.

In accordance with another aspect of the present invention, there is provided a video game system that further includes a light sensor housed in the control unit. The light sensor detects one or more light pixels from the video display and produces a detection signal to the game controller. The game controller determines from the detection signal the light pixels detected from the video display.

The present invention is particularly suited for video games where hand-held guns, swords, bats, clubs, rackets, gloves, etc. are used to manipulate characters on a video display.

BRIEF DESCRIPTION OF THE DRAWINGS

The foregoing and other advantages of the invention will become apparent upon reading the following detailed description and upon reference to the drawings in which:

FIG. 6b is a side view of the control unit of FIG. 2 overlaid on the coordinate system of FIG. 6a;

FIG. 6c is a back view of the control unit of FIG. 2 overlaid on the coordinate system of FIG. 6a.

Figure 5:
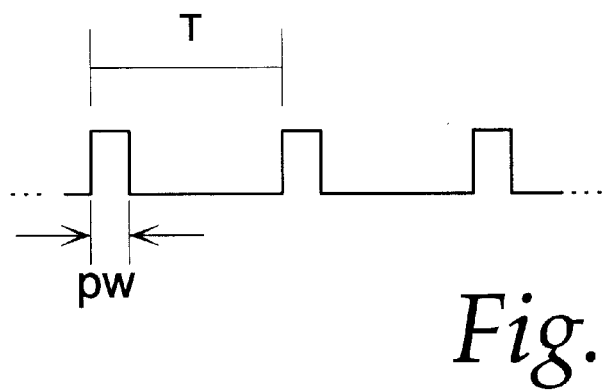
FIG. 5 is a timing diagram of an acceleration output from the accelerometer of FIG. 4.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
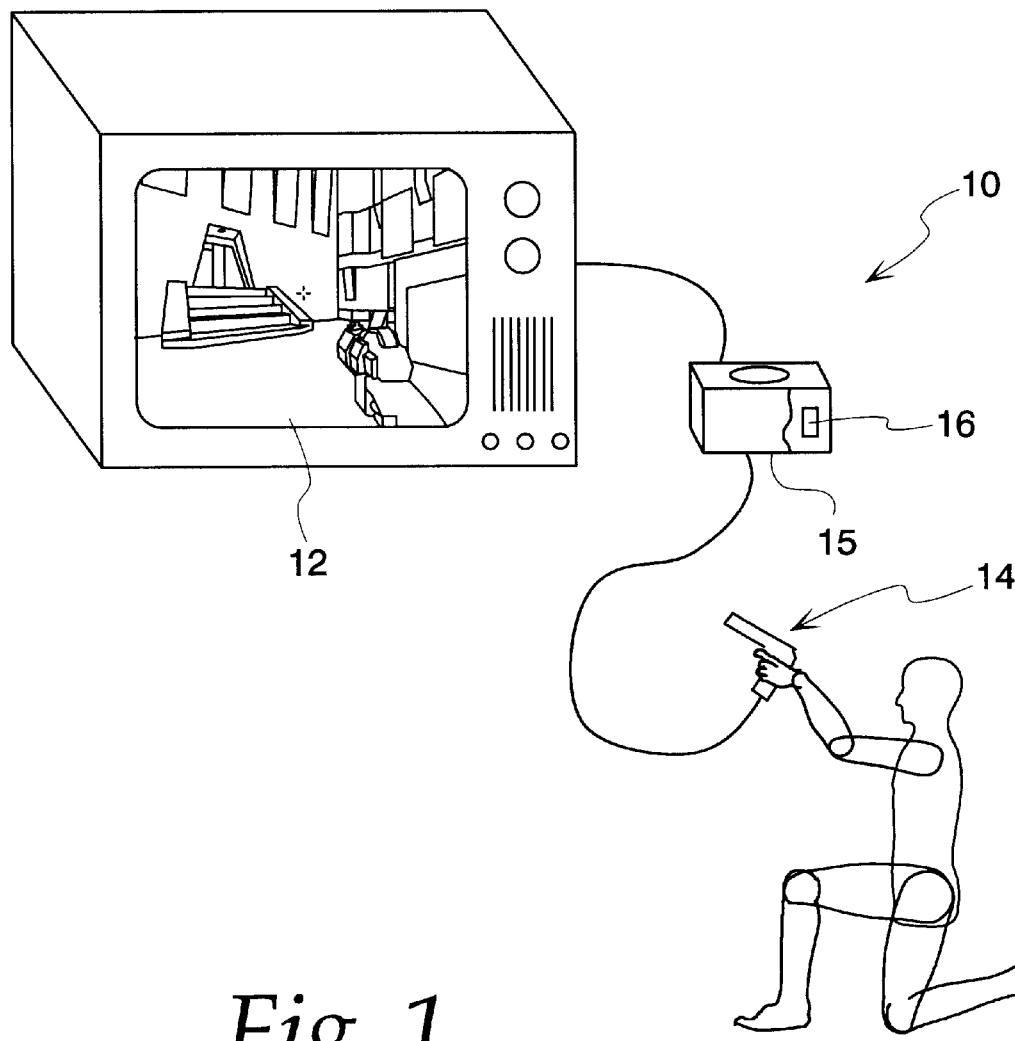
FIG. 1 is a perspective view of a video game system according to one embodiment of the present invention.
Figure 3:
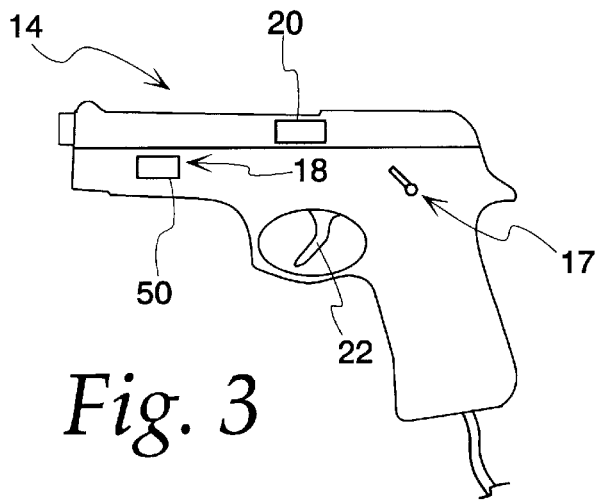
FIG. 3 is a cross-sectional side view of a control unit for use with the system of FIG. 1.

Turning now to the drawings and referring initially to FIG. 1, one embodiment of the present invention is shown to include a video game system 10 comprising a video display 12, a hand-held control unit 14, and a game controller 15, which includes a central processing unit (CPU) 16. The control unit 14 includes an accelerometer 18 housed therein, as illustrated in FIG. 3.

Figure 2:
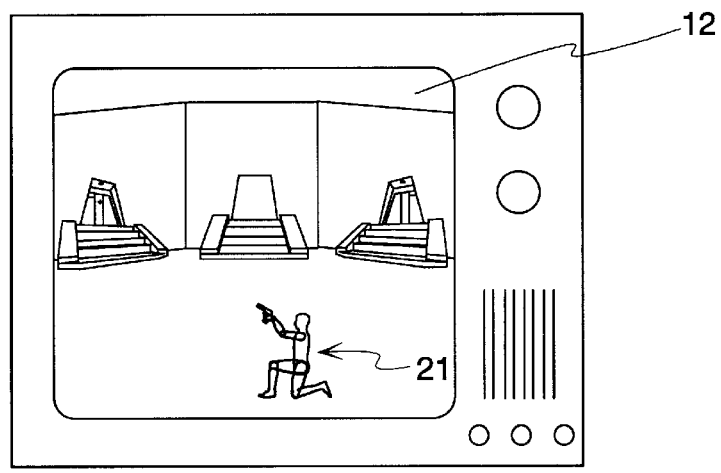
FIG. 2 is a front view of a video display for use with the system of FIG. 1.

In one embodiment, the accelerometer 18 is an ADXL202 from Analog Devices of Norwood, Mass. The ADXL202 is a capacitive, 2-axis accelerometer. The accelerometer 18 is coupled to the game controller 15, which includes the CPU 16. The accelerometer 18 senses the tilt of the control unit 14 with respect to a first axis and a second axis. Thus, the accelerometer 18 provides two output signals that are proportional to the acceleration in each of the two axes sensed by the accelerometer 18 (e.g., the x and y axes). From this information, the game controller 15 can determine the relative position of the control unit 14. For example, the accelerometer 18 can sense when the control unit 14 is tilted up, down, left or right. The accelerometer 18 produces a first signal and a second signal indicating the tilt of the control unit 14 with respect to the first and second axes, respectively. The game controller 15 processes the tilt information from the accelerometer 18 to control the movement of a game character 21 on the video display 12, as illustrated in FIG. 2. For example, where the control unit 14 is a hand-held gun for use with a video game, a character's orientation or heading in the game environment can be changed by merely tilting the control unit 14 up, down, left or right. Thus, in one embodiment, when the control unit 14 is tilted up, the character moves backwards; when it is tilted down, the character moves forwards; when it is tilted to the left, the character moves left; and when it is tilted to the right, the character moves right. For example, a player can choose to navigate the character 21 through the left passageway of the game environment shown on the display 12 illustrated in FIG. 2 by tilting the control unit 14 to the left. Alternatively, the player can choose to navigate the character 21 through the center passageway by tilting the control unit 14 down, and so on.

In another embodiment, when the control unit 14 is tilted left or right, a character is rotated left or right, respectively. For example, in this embodiment, the control unit 14 controls a tank gun turret. By tilting the control unit 14 left, the gun turret is rotated left; by tilting the control unit 14 right, the gun turret is rotated right, by tilting the control unit 14 up, the gun is aimed up; and by tilting the control unit 14 down, the gun is aimed down.

In still another embodiment, when the control unit 14 is tilted up or down, a character moves up or down, respectively. For example, by tilting the control unit 14 down, a character climbs down a ladder; by tilting the control unit 14 up, a flying object is moved up, etc. Thus, the accelerometer 18 detects whether the control unit 14 is tilted up, down, left or right. This enables the game controller 15 to respond to the motion of the control unit 14 to control a character in a video game.

Figure 4:
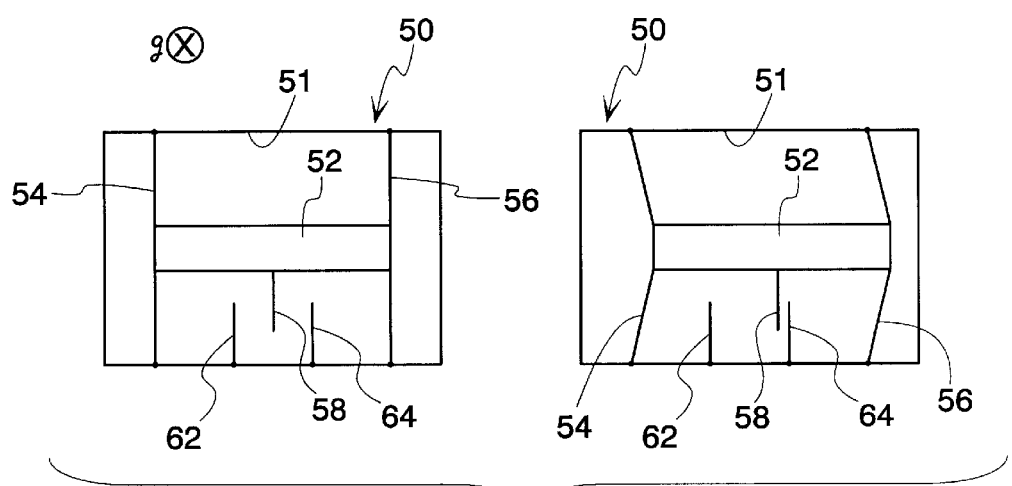
FIG. 4 is a functional diagram of an accelerometer for use in the control unit of FIG. 2.

The accelerometer 18 senses tilting motion by combining microscopic moving silicon parts and output signal conditioning circuitry in one, low-cost chip 50, as illustrated in FIG. 3. The accelerometer 18 allows a player who moves the hand-held control unit 14 to control the action of a character in a video game. The accelerometer 18 includes micromachine technology that detects the capacitance between a metallic finger and a plate extending from the inside of a micromachine enclosure. A functional diagram of how the capacitive accelerometer 18 operates is illustrated in FIG. 4.

The accelerometer chip 50 houses a mass 52 which is attached at respective ends to a pair of tethers 54 and 56 having spring-like properties. Each tether 54 and 56 is anchored at respective ends to inside surfaces of the micromachine enclosure 51. A metallic finger 58 extends from a side of the mass 52. Two generally parallel metallic plates 62 and 64 extend from one inside surface of the micromachine enclosure 51, and generally orthogonal thereto. A capacitance can be measured between the finger 58 and one or both of the plates 62 and 64. FIG. 4 illustrate top views of the accelerometer chip 50. When the chip 50 is level and at rest, i.e., the gravitational field g is perpendicular to the page, the mass 52 is equidistant from both plates 62 and 64. However, when the chip 50 is, for example, tilted right (i.e., the right side of the chip 50 is tilted into the page), the mass 52 moves to the right, thereby changing the capacitance measured between finger 58 and the plates 62 and/or 64.

In this embodiment, the capacitive accelerometer 18 outputs two Duty Cycle Modulated (DCM) signals, each DCM signal having a resolution of 14 bits. The duty cycle for each DCM output is proportional to the acceleration in each of the two axes sensed by the accelerometer 18 (e.g., the x and y axes). The duty cycle is the ratio of pulsewidth pw to period T, as illustrated in FIG. 5. These DCM outputs may be measured directly by a microprocessor, such as CPU 16, without an analog-to-digital converter.

Thus, the duty cycle for each output signal equals pw/T. The acceleration experienced by the accelerometer 18 is calculated by the following formula:

$$acceleration \equiv \frac{\text{Duty Cycle} - \text{Duty Cycle at Zero g}}{\text{Duty Cycle per g}}$$

where the nominal Duty Cycle at Zero g is 50% and where the Duty Cycle per g is 12.5%. Therefore, to calculate acceleration from the duty cycle output from the accelerometer, the following formula is used:

$$acceleration \equiv \frac{(pw/T) - 50\%}{12.5\%}$$

The above formulas represent acceleration estimates. For higher accuracy measurements, the actual offset (Duty Cycle at Zero g) and scale (Duty Cycle per g) values must be substituted. More detailed information regarding the accelerometer used in one embodiment of the invention can be found in a whitepaper entitled, "Using the ADXL202 with a Microcontroller", by Harvey Weinberg of Analog Devices, and the ADXL202/ADXL210 datasheet, which are incorporated herein by reference in their entirety and available from Analog Devices on the internet at www.analog.com.

Figure 6B:
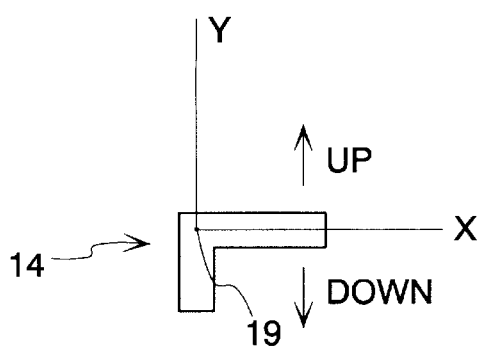
Figure 6C:
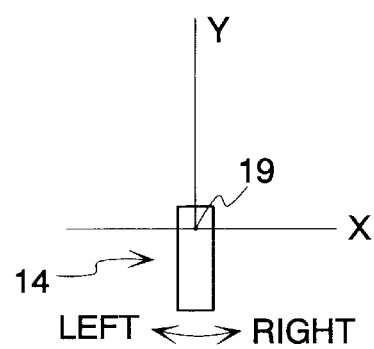
Figure 6A:
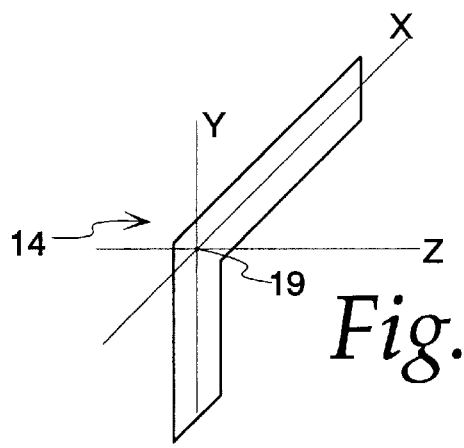
FIG. 6a is a perspective view of the control unit of FIG. 2 overlaid on a coordinate system.

FIGS. 6a–c illustrate the control unit 14 overlaid on an x-y coordinate system. In FIG. 6a, the control unit 14, having the shape of a gun, has its barrel disposed along the x-axis while the handle is disposed along the y-axis. As shown in FIG. 6b, when the control unit 14 is tilted up (pivoting about pivot point 19), the barrel moves in the positive y direction. Likewise, when the control unit 14 is tilted down (pivoting about pivot point 19), the barrel moves in the negative y direction. As shown in FIG. 6c, when the handle of the control unit 14 is tilted to the left (pivoting about pivot point 19), the handle moves in the negative x direction. Likewise, when the handle of the control unit 14 is tilted to the right (pivoting about pivot point 19), the handle moves in the positive x direction. Thus, for example, the DCM acceleration signals output from the accelerometer 18 would have the following duty cycle values:

|       | X     | Y     |
|-------|-------|-------|
| up    | 0.5   | 0.625 |
| down  | 0.5   | 0.375 |
| left  | 0.375 | 0.5   |
| right | 0.625 | 0.5   |

The duty cycle values represent the duration of the pulsewidth pw versus the period T. For example, the duty cycle of 0.625 corresponds to a pw of 62.5 units out of a 100 unit period T. The duty cycle of 0.5 corresponds to a pw of 50 units out of a 100 unit period T. From these values, the game controller 15 determines what direction the control unit 14 is being tilted.

As will be appreciated by those skilled in the art, multiple single axis accelerometers may be used in place of the two-axis accelerometer 18, and/or a combination of single and/or multi-axis accelerometers may be used to sense acceleration in one or more axes.

In one embodiment, the control unit 14 also includes a light sensor 20 housed in the control unit 14. As illustrated in FIG. 3, in one embodiment, the control unit 14 is a gun used in connection with video games where a player holding the control unit 14 shoot characters and/or targets in the game environment shown on the display 12 by aiming the gun at the display 12. The light sensor 20 is coupled to the game controller 15. In this embodiment, the light sensor 20 is activated when the player squeezes the gun trigger 22. While the gun trigger 22 is squeezed, the light sensor 20 detects incoming light from the video display 12 corresponding to where the control unit 14 is pointed on the video display 12. In response to detecting this light, the light sensor 20 produces a detection signal to the game controller 15. The game controller 15 then determines where on the video display 12 the gun is aimed, as described in more detail below.

The video display 12 is a typical cathode ray tube (CRT) monitor that generates a picture by tracing a plurality of pixels in horizontal rows, one after the other down the entire display. After the last pixel in the last row is produced, the display 12 is refreshed by tracing a plurality of pixels beginning again at the first row. Typically, the display 12 is refreshed at a rate of 30 Hz to 60 Hz. Thus, the refresh process is so rapid that the human eye sees what appears to be a complete image comprised of all the pixels.

Figure 7:
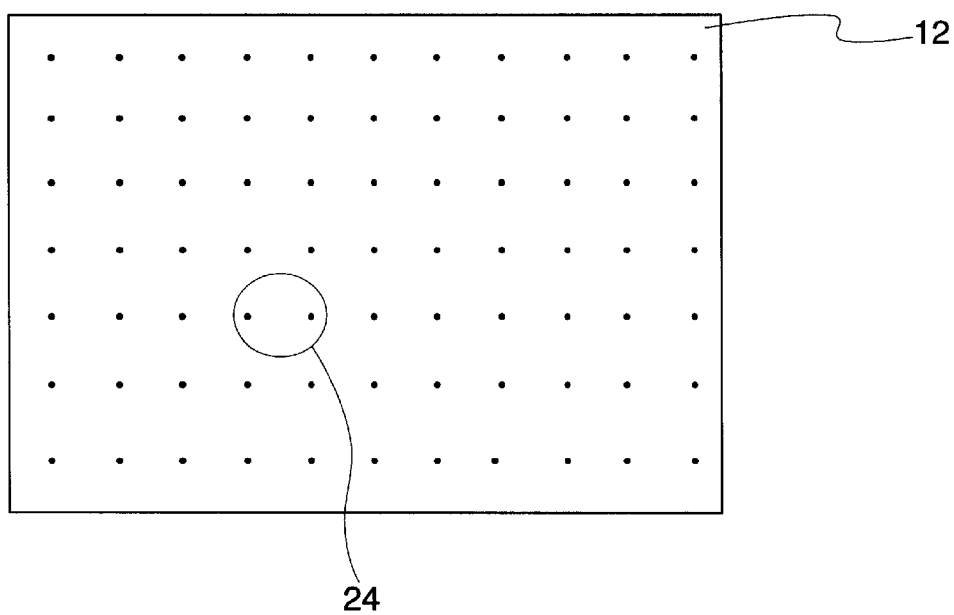
FIG. 7 is a front view of a video display showing the position of a plurality of pixels.

For example, a typical VGA high resolution monitor includes 640 pixels per row and 480 rows, i.e., a 640×480 monitor. The display 12 is broken down into horizontal and vertical coordinates corresponding to each pixel. Monitors typically trace pixels in horizontal rows, starting in the upper left hand corner, proceeding from left to right, as illustrated in FIG. 7. After the last pixel in a row is produced, the next row is started. After the last row is completed, the process begins again at the top left-hand corner of the display. In one embodiment, the first pixel produced in the upper left-hand corner is at coordinates (1,1) which corresponds to horizontal row 1, vertical column 1. The next pixel produced is at coordinates (1,2) which corresponds to horizontal row 1, vertical column 2. The first pixel in the next row has coordinates (2,1) which corresponds to horizontal row 2, vertical column 1. The last pixel in the last row has coordinates (480, 640) which corresponds to horizontal row 480, vertical column 640. A pair of counters keep track of which pixel is currently being produced. As each pixel is produced, the column counter is incremented. When the next row is started, the row counter is incremented. The counters are reset every time the display is refreshed, i.e., each time the first pixel in the first row is produced, the horizontal and vertical counters will each contain a 1.

In the embodiment where the control unit 14 is a gun, when the gun trigger 22 is pulled, the light sensor 20 is activated, allowing only a narrowly focused area of light to enter the sensor 20. This is accomplished by a series of apertures that collimate the incoming light so that only light directly in front of the sensor 20 is detected. In this way, the sensor 20 detects light from an area 24 aimed at on the display 12. For example, once the trigger 22 is squeezed, the sensor 20 is activated. Normally, no pixels are currently being produced in the area 24 where the gun is aimed at on the display 12. However, the trigger 22 is typically squeezed for a duration of tens of milliseconds. During this time, the display 12 is refreshed numerous times in light of a typical display refresh rate of between 30 Hz to 60 Hz. When the area 24 being aimed at on the display 12 produces one or more pixels, the light from those pixels is detected by the sensor 20. The light sensor 20 then produces a detection signal to the game controller 15. Upon is receiving the detection signal, the game controller 15 stores the horizontal and vertical coordinates (which are stored in the counters) corresponding to the pixel(s) aimed at on the video display 12. In this way, the area 24 where the control unit 14 is being aimed at on the video display 12 is determined. This information can then be used by the game controller 15 to determine whether a target on the display 12 was hit.

Accordingly, a control unit 14 including an accelerometer and a light sensor 20 can be used in connection with video games such as, for example, Area 51™ and Magnum Force™, where the game player uses the control unit 14 (e.g., a light gun) to choose a target to shoot at by pointing at different positions on the display 12 and pulling the light gun's trigger 22 (i.e., the player aims and shoots). The player then tilts the control unit 14 to navigate the character through the game environment, as described above. This makes for a more exciting and intuitive interaction with the video game as compared with games where the game controller automatically selects where the character moves in the game environment after certain targets are shot.

Operation of the control unit 14 is intuitive because the accelerometer 18 translates natural hand and/or body movements into character movement in the game environment. For example, in addition to the above described embodiments where the control unit 14 is used to shoot targets and navigate a game environment, in another embodiment, the control unit 14 is a pair of handles that the player holds, each handle including an accelerometer inside and a touch sensor on the outside to sense whether each hand is open or closed. Thus, in a game such as Mortal Kombat®, the player can pick-up objects in the game environment and, by moving the pair of handles, the player can also punch and/or kick.

In a further embodiment, the control unit 14 is a sword, stick or "light saber" with an accelerometer inside that allows the player to fight against a computer-generated character on the display or other players linked to the video game system.

In still another embodiment, the control unit 14 is a bat, club or racket with an accelerometer inside that allows the player to swing and hit balls on the display.

In another embodiment, the control unit 14 comprises a chair for use with a hovercraft game. The player sits in the chair, which houses an accelerometer, and the chair is tilted by the game controller to simulate movement over various surfaces, such as rough and smooth surfaces. The accelerometer provides feedback to the game controller such that game controller can ascertain the relative position of the chair during play of the game. In one embodiment, the chair is supported by an air-bag motion system. Air is injected into or released from the air-bag to tilt the chair according to selected game conditions.

Additionally or alternatively, a small motor or solenoid (of the type used in electronic pagers) can be added to the control unit 14 to produce vibration to give the effect of powering-up an energy weapon, to signal weapon overload, to simulate recoil, to simulate hitting a ball, etc.

In some of the embodiments mentioned above, such as, for example, the sword game, where a player with a sword having an accelerometer inside fights against a computer-generated character on the display or other players linked to the video game system, further information about the position of the control unit (e.g., the sword) is desired to produce a more realistic game. Because the above-described accelerometer only gives the game controller the relative position of the control unit (i.e., whether the control unit is being moved up, down, left or right), other information about how the control unit is being moved is often desirable. For example, it may be desirable in our sword example to know whether the player is making an over-head swing, a side swing or a parry with the sword.

To determine how the sword is being swung, information must be gathered about the acceleration output from the accelerometer during various actions or moves using the control unit. One way to gather such acceleration information is to use a motion capture laboratory. For example, in the lab, a player holds the control unit. The control unit and the player are both fitted with reflective material. The lab contains several cameras, such as red light cameras (at least three of which must always have the player and control unit in view at all times to obtain movement information about three axes), to capture the light reflected from the control unit and the player. Then, the player performs a number of routine moves with the control unit. For example, the player performs an over-head swing, a side swing and a parry with the control unit (e.g., a sword). The motion of the player and the control unit for each move is captured (at certain time intervals) along with the corresponding acceleration information from the accelerometer in the control unit. Typically, acceleration data for three axes is required.

Therefore, after data is captured for various control unit actions, the game controller can be programmed to recognize certain acceleration data as corresponding to a certain, pre-defined move. The matching between the acceleration data and the pre-defined moves is done with known curve-matching techniques. The result is a more realistic game that uses the player's hand and/or body motion to control a game character. Capturing certain motion data beforehand allows for greater accuracy in determining what moves the player is actually making with the control unit.

Thus, the present invention is directed to a single, hand-held control unit 14 that allows a player to shoot and/or strike targets on the display 12 and move about the game environment by simply moving the control unit 14 with natural hand/body movements. Therefore, only one hand-held device (control unit 14) is required to completely control the game. Accordingly, the present invention allows game characters to follow any path in the game environment instead of being confined to predefined paths. The invention allows a character to, for example, walk anywhere in the game environment while shooting at the same time. Additionally or alternatively, the invention allows a character to, for example, walk anywhere in the game environment, stop, and then shot at a target. In this way, when the player must aim at the top of the display 12 to shoot a target, the game character will not move backwards. In this embodiment, the player uses a switch (or button) 17 to toggle between shooting mode and movement mode, as illustrated in FIG. 3. In operation, the player switches the switch 17 to movement mode to navigate a character through a game environment. Then, when the player finds a target to shoot, the switch 17 is toggled to the shooting mode so the player can shoot the target using the light sensor, as described above. Toggling between the shooting mode and the movement mode deactivates the accelerometer and the light sensor, respectively. In another embodiment, the switch 17 has three setting, shooting mode, movement mode and move-and-shoot mode. Move-and-shoot mode allows the player to navigate a character through the game environment while being able to shoot targets at the same time. Thus, both the accelerometer and the light sensor are activated in this mode.

In one embodiment, three or more accelerometers are used to sense acceleration in three or more axes. Thus, the single hand-held control unit 14 allows the player to control exactly where the game character goes in a 3-dimensional game environment.

The addition of one or more accelerometers to a control unit is unobtrusive due to the small size and weight of accelerometers. In one embodiment, the accelerometers used are $\frac{3}{8}$ in. x$\frac{3}{8}$ in.x$\frac{3}{16}$ in. and add less than one ounce to the weight of the control unit.

The control unit 14 of the present invention can be used in both home video games as well as coin-operated video games.

The control unit 14 illustrated and described in connection with the description above has the shape of a gun. However, as the above list of alternative uses for the control unit 14 indicates, other embodiments of the control unit 14 are contemplated. It will be appreciated by those skilled in the art that the control unit 14 may be fashioned in any of several alternative configurations, shapes and sizes, depending upon the application.

Thus, while the present invention has been described with reference to one or more embodiments, those skilled in the art will recognize that many changes may be made thereto without departing from the spirit and scope of the present invention which is set forth in the following claims.

What is claimed is:

1. A video game system comprising:
   a game controller;
   a hand-held control unit coupled to the game controller and housing an accelerometer and a light sensor,
   the accelerometer sensing tilt of the control unit with respect to an axis, the accelerometer producing an acceleration signal indicating the tilt of the control unit with respect to the axis, the game controller processing the acceleration signal to control the movement of a game character on a video display coupled to the game controller and further processing the acceleration signal to control directional navigation of the game character through a game environment, said navigation corresponding to the tilt of the hand-held control unit,
   the light sensor detecting one or more light pixels from the video display corresponding to a direction in which the hand-held control unit is pointing, the light sensor producing a detection signal to the game controller, the game controller determining from the detection signal the light pixels from the video display detected by the light sensor.

2. The video game system of claim 1, wherein the accelerometer is a capacitive accelerometer.

3. The video game system of claim 1, wherein the accelerometer is a two-axis accelerometer.

4. The video game system of claim 1, wherein the video display traces a plurality of individual pixels, one at a time, along horizontal rows.

5. The video game system of claim 4, wherein each pixel has a horizontal and vertical coordinate.

6. The video game system of claim 5, wherein the game controller, upon receiving the detection signal, stores the horizontal and vertical coordinates of the pixels aimed at on the video display.

7. The video game system of claim 1 further comprising a switch on said hand-held control unit for switching between operation of the accelerometer and the light sensor.

8. The video game system of claim 1 further comprising a switch on said hand-held control unit for switching between operation of the accelerometer, operation of the light sensor, and operation of both the light sensor and the accelerometer.

9. A method of making a video game system comprising the steps of:
   providing a game controller,
   providing a hand-held control unit coupled to the game controller,
   housing an accelerometer in the control unit, the accelerometer being adapted to sense tilt of the control unit with respect to an axis, the accelerometer being adapted to produce an acceleration signal to the game controller indicating the tilt of the control unit with resect to the axis, the game controller processing the acceleration signal to control the movement of a game character on a video display coupled to the game controller and further processing the acceleration signal to control directional navigation of the game character through a game environment, said navigation corresponding to the tilt of the hand-held control unit,
   housing a light sensor in the control unit, the light sensor being adapted to receive one or more light pixels from a video display coupled to the game controller and to produce a detection signal to the game controller, the game controller determining from the detection signal the light pixels from the video display detected by the light sensor; and
   configuring the game controller to determine from the detection signal where the control unit is aimed at on the video display.

10. The method of claim 9, wherein the accelerometer is a two-axis accelerometer.

11. The method of claim 9, wherein the accelerometer includes a micromachined enclosure, a mass and a pair of tethers, the mass being attached at respective ends to the pair of tethers, each tether being anchored at respective ends to inside surfaces of the micromachined enclosure.

12. The method of claim 11, wherein the accelerometer includes a metallic finger extending from a side of the mass, two generally parallel metallic plates extending from one inside surface of the micromachined enclosure and generally orthogonal thereto, a capacitance being produced between the finger and one of the plates.

13. The method of claim 9, wherein tilting the accelerometer about the axis produces a change in capacitance.

14. The method of claim 9, wherein the control unit is shaped in the form of a gun.

15. A method of controlling a character in a video game system, the system including a game controller, a hand-held control unit, and a video display, the game controller being coupled to the control unit and the video display, the control unit containing an accelerometer and a light sensor, the accelerometer sensing tilt of the control unit with respect to an axis, the light sensor being housed in the control unit, the method comprising the steps of:
   using the accelerometer in the control unit to produce an acceleration signal indicating the tilt of the control unit with respect to the axis;
   transmitting the acceleration signal to the game controller;
   processing the acceleration signal with the game controller to control directional navigation of the game character through a game environment, said navigation corresponding to the tilt of the hand-held control unit;
   using the light sensor in the control unit to detect one or more light pixels from the video display and thereby produce a detection signal corresponding to a direction in which the control unit is pointing;
   transmitting the detection signal to the game controller;
   determining from the detection signal the light pixels detected from the video display by the light sensor; and
   determining whether a target on the video display has been hit.

16. The method of claim 15, wherein the accelerometer includes a micromachine enclosure and a mass.

17. The method of claim 15, further including the steps of:
   tilting the accelerometer about the axis; and
   producing a change in capacitance.

18. The method of claim 15, wherein the control unit is shaped in the form of a gun.

19. The method of claim 15, further including the steps of:
   tracing a plurality of individual pixels on the video display, one at a time, along horizontal rows.

20. The method of claim 19, further including the step of assigning each pixel a horizontal and vertical coordinate.

21. The method of claim 20, further including the step of storing the horizontal and vertical coordinates of the pixels aimed at on the video display in response to receiving the detection signal at the game controller.

* * * * *